US008650601B2

(12) United States Patent
Allegrezza et al.

(10) Patent No.: US 8,650,601 B2
(45) Date of Patent: Feb. 11, 2014

(54) VIDEO ON DEMAND MANAGEMENT SYSTEM

(75) Inventors: Fred J. Allegrezza, Hatfield, PA (US); Phillip A. Gabler, Doylestown, PA (US); Robert C. Gaydos, Jr., Harleysville, PA (US); Ludwig Clifford Lewis, II, Jamison, PA (US); Kirk L. Somers, Alpharetta, GA (US)

(73) Assignee: Concurrent Computer Corporation, Duluth, GA (US)

( * ) Notice: Subject to any disclaimer, the term of this patent is extended or adjusted under 35 U.S.C. 154(b) by 1828 days.

(21) Appl. No.: 10/305,402

(22) Filed: Nov. 26, 2002

(65) Prior Publication Data

US 2004/0103437 A1    May 27, 2004

(51) Int. Cl.
*H04N 7/173* (2011.01)
*H04N 21/231* (2011.01)

(52) U.S. Cl.
CPC .............................. *H04N 21/23103* (2013.01)
USPC .............................................. 725/93; 725/92

(58) Field of Classification Search
USPC ......................................... 725/87, 91, 92, 96
See application file for complete search history.

(56) References Cited

U.S. PATENT DOCUMENTS

| | | | | |
|---|---|---|---|---|
| 5,892,535 | A | * | 4/1999 | Allen et al. ..................... 725/36 |
| 5,898,456 | A | | 4/1999 | Wahl |
| 5,920,700 | A | * | 7/1999 | Gordon et al. ................ 709/226 |
| 6,094,680 | A | * | 7/2000 | Hokanson ..................... 709/223 |
| 6,115,740 | A | * | 9/2000 | Mizutani ....................... 709/217 |
| 7,024,466 | B2 | * | 4/2006 | Outten et al. ................ 709/219 |
| 2002/0049977 | A1 | | 4/2002 | Miller et al. |
| 2002/0144283 | A1 | * | 10/2002 | Headings et al. ............. 725/109 |
| 2003/0093544 | A1 | * | 5/2003 | Richardson .................. 709/231 |
| 2003/0149975 | A1 | * | 8/2003 | Eldering et al. ................ 725/34 |
| 2005/0041679 | A1 | * | 2/2005 | Weinstein et al. ............ 370/432 |
| 2008/0172690 | A1 | * | 7/2008 | Kanojia et al. .................. 725/36 |
| 2010/0146566 | A1 | * | 6/2010 | Taylor et al. .................... 725/87 |

FOREIGN PATENT DOCUMENTS

GB          2385683 A       8/2003
WO        WO 00/60861 A   10/2000

* cited by examiner

*Primary Examiner* — Nathan Flynn
*Assistant Examiner* — Omar S Parra
(74) *Attorney, Agent, or Firm* — Philip H. Burrus, IV

(57) ABSTRACT

A video on demand (VOD) asset management system (100). Content is moved within the VOD system in accordance with predetermined variables such that certain content, such as that which is in high demand, is located on a server (120, 125) which is nearer to a subscriber (130), and content which is in lesser demand is located on a server (110, 115) which is more remote from the subscriber. Content may also be duplicated or moved within the system based upon other variables such as demographics of the subscriber, whether there is an advertising campaign for the content, and the age of the content.

32 Claims, 4 Drawing Sheets

VIDEO ON DEMAND MANAGEMENT SYSTEM

BACKGROUND OF THE INVENTION

1. Field of the Invention

The present invention relates to the field of video-on-demand servers and systems and content management for video-on-demand servers.

2. Description of the Related Art

Delivery of client selected video content directly to a subscriber at a time chosen by the subscriber via a cable TV or other distribution network is a fast growing segment of the entertainment industry known as Video-on-Demand or VOD. The industry is enabled by new technology but sales are driven by the availability of up-to-date content demanded by consumers.

Subscribers of VOD are quite demanding and expect excellent performance from VOD systems. This is especially true for advanced VOD systems such as Interactive Video on Demand (IVOD) in which a user can manipulate the video, such as stopping, rewinding, pausing or fast forwarding. With increasing demand for VOD services, system operators are faced with difficult challenges. VOD systems have a finite storage capacity, which is dependent upon the capacity of video servers distributed throughout the system. Further, within a VOD system there are multiple storage locations relative to the proximity of a subscriber where VOD content files may be stored; content may be stored at a VOD server very close to the subscriber (such as at the node), farther from the subscriber (such as at a headend), or still farther from the subscriber (such as at a region center or cable library).

The storage capacity varies by server, and the server storage capacity at a particular location will be based, at least in part, upon the number of subscribers, subscriber characteristics, demand/usage patterns, etc. Thus, portions of a VOD system will have smaller capacity servers and therefore cannot store as much content or provide the content as readily as portions which have larger capacity servers. Although storage capacity can be expanded, such expansion imposes additional costs to the system operator which, in most cases, cannot be readily passed on to the customer. Thus, the system operator is faced with the challenge of managing and storing content files in the VOD system in a way that provides adequate performance at a reasonable cost.

The least expensive way to store content is to keep as much content as possible at the library server because this server can distribute the content to the largest number of subscribers. This reduces the cost of storage as the System operator does not need to purchase as much storage capacity for the other downstream servers. In so doing, a System operator takes advantage of his "economy of scale" in that the greatest number of subscribers has access to the content. However, location of content may impact performance. Content stored far away from subscribers on library servers may result in decreased performance for the subscriber as the content may be unavailable immediately upon request and/or there may be noticeable latencies (delay times) in delivering the content from the distant storage, or there may be unacceptable system demands in moving massive amounts of content to the subscribers at high-load time periods. It is difficult for a system operator to manage this tradeoff between cost and performance in storing content files especially when the demand for different content varies rapidly over time.

Thus there is a need for a system that efficiently manages the storage of video content files within various storage segments of a VOD system so as to provide acceptable performance to the subscribers at a reasonable cost to the system operator.

SUMMARY OF THE INVENTION

The present invention provides a method of managing content for a video on demand (VOD) system, where the VOD system comprises a plurality of VOD servers, the plurality of VOD servers contain a plurality of content files, and some servers are located nearer to a customer than more remote servers. The method includes automatically monitoring the demand for the content files, determining whether the demand for a content file on a server of the plurality of VOD servers has a predetermined quality, and if the demand has predetermined quality then moving the content file to a different server.

The present invention also provides an apparatus for performing the method.

The present invention thus provides for efficient management of VOD server storage capacity.

The present invention dynamically moves content between the various storage locations of a VOD network based upon one or more desired characteristics, such as content demand, content usage, content age, the demographics of subscribers, etc. The present invention automatically monitors the desired characteristics and then moves content between storage locations along the system accordingly.

The system moves higher demand content to storage devices nearer the subscribers where the content may be maintained until demand subsides, at which time the content may be moved further from the subscriber, such that content of high interest to subscribers occupies the valuable space nearer the subscribers.

Variables other than demand may also be monitored and used to dynamically move content, such as the age of the content or the presence of an advertising campaign. For example, when content is newly released, or when there is an advertising push for the content, the content may be moved out near the subscribers where the most advertising dollars are invested. After the content has aged for a predetermined time, or when the ad campaign subsides, the content may be moved away from the subscribers to other storage locations. Likewise, other variables may be used such as the demographics of the subscribers ordering the content.

DETAILED DESCRIPTION OF THE INVENTION

Figure 1:
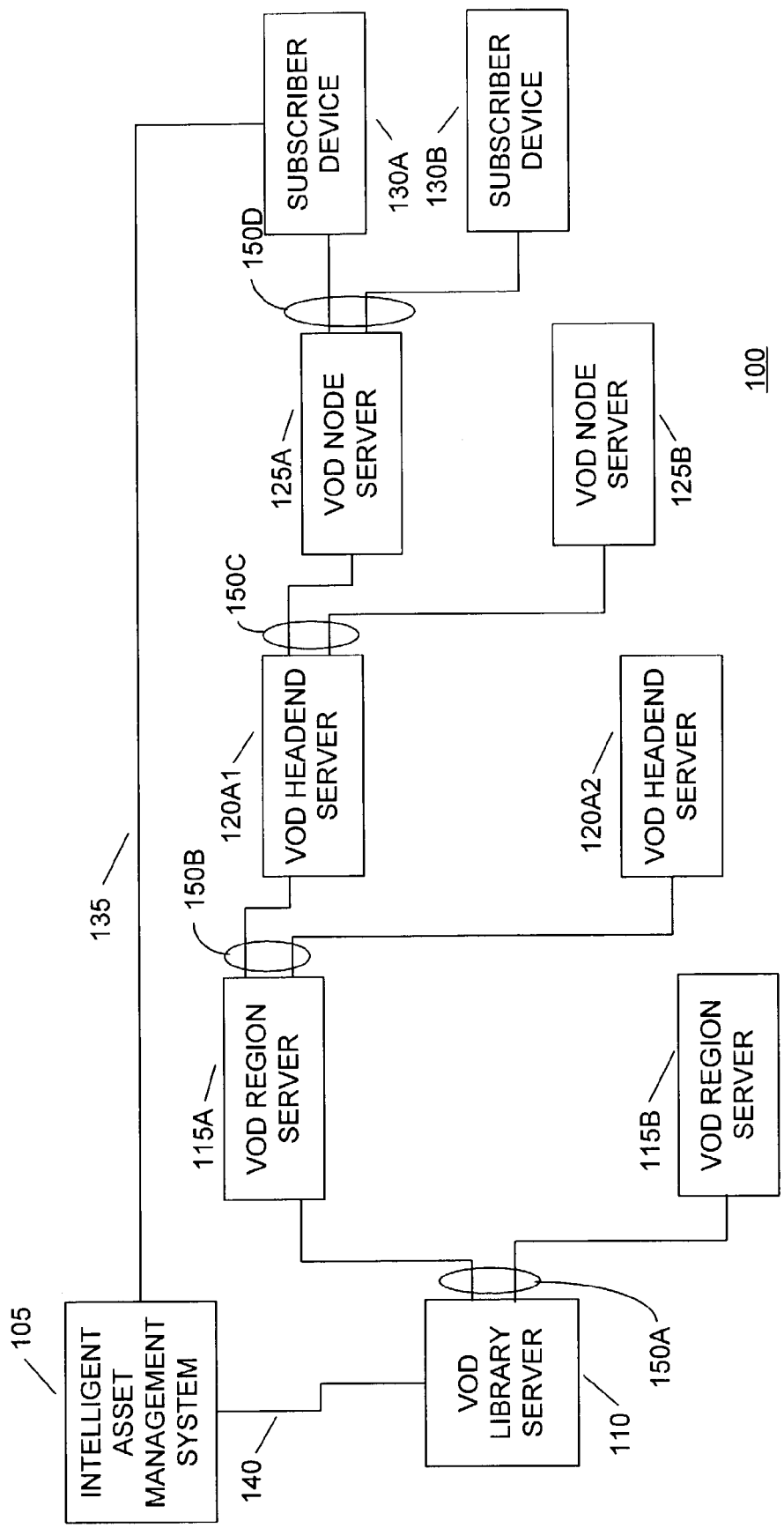
FIG. 1 illustrates a Video On Demand system in accordance with the present invention.

FIG. 1 illustrates a Video On Demand (VOD) system 100 in accordance with the present invention. The video servers 110, 115, 120, and 125 are capable of storing quantities of video content, and are used to store, manage, and deliver quantities of video in the form of video content files across an interactive network upon the request of a subscriber. The video servers may store the content or the content may be stored on a storage drive coupled to a video server. For ease, the term video server as used herein shall include both of these configurations. The interactive network 135, 140, 150 may be any type of network capable of transferring data electronically such as, but not limited to, cable networks, the Internet, wireless networks, Telco networks, or satellite networks. A subscriber 130 is the end-user who will receive the video content for viewing. The network equipment 105, 110, 115, 120, 125 provides the managing, processing, and modulation, as appropriate, for the delivery of the video content across the network to the customer's interface device, such as, but not limited to, a set-top-box, personal computer, lap-top, personal digital assistant, cellular phone or the like. For ease of explanation, this description shall use the terminology for a cable network but the present invention can be implemented on other types of networks even though the terminology might be different. Cable networks (and other networks) are typically divided into distinct geographical areas ("Systems") serving subscribers in the areas. In large regions such as the United States there are typically Multiple System Operators ("MSOs"), each operating multiple Systems.

The VOD servers within a System may be arranged in a distributed system architecture such that multiple video servers are distributed throughout the network transport infrastructure. As shown in FIG. 1, a single large capacity VOD server 110 may serve as a cable library. The cable library VOD server serves content to region servers 115 which serve content to multiple headend VOD servers, which in turn serve content to multiple node VOD servers 125, which in turn supply content to subscribers' devices 130. The number of server locations and the number of servers located at different locations is by way of example only, may vary depending upon the particular requirements of the System, and may include additional VOD servers, such as hub servers between the headend servers and the nodes.

Thus, the distributed system architecture resembles a tree in which the storage capacity of individual VOD servers generally decreases with increased proximity to the subscriber. The system branches from a large capacity VOD server such as a VOD cable library 110 into ever smaller VOD server branches having smaller storage capacity. For example, a library server 110 may contain archives of 5000 hours of content (content may be composed of movies, special programs, educational materials, broadcasts, and any other viewable materials), a region server 115 may have 1500 hours of content, a headend server 120 may have 250 hours of content, and a node server may have 50 hours of content. However, the number of levels of servers or content storage may be one or more, depending on the network and content demand.

Preferably, the VOD System is managed so that higher demand content is located closer to the subscriber 130, thereby increasing the delivery performance of high demand content to the subscriber. For example, in FIG. 1 the cable library server 110 may only be responsible for library content which has low demand, the region servers 115 for region content having a higher demand and the headend servers 120 for content having the highest demand. In this way the burden and inefficiency of moving content to the customer from distant VOD servers via the network is decreased or eliminated as the least demanded content is stored at more distant servers while the content having the highest demand is stored at the closer servers.

In addition, limitations on service may occur if a content file is maintained in only one location (one copy) in a disk array. For example, a disk drive within a server with streaming capacity of 22 megabytes/second or 176 megabits/second can support 45 simultaneous streams of content at a streaming rate of 3.75 megabits/second. Thus, once the server had initiated 45 streams from that disk, the disk would be unable to provide any additional streams of that content, or provide any streams for any other content maintained on the disk. As a result, if a content file is maintained in one location within a disk array, the capacity of the disk to stream that one piece of content can easily be exceeded. This limitation is accentuated in a server architecture utilizing a fibre channel switch architecture as described in U.S. Utility patent application Ser. No. 09/839,581, entitled System and Method for Retrieving and Storing Multimedia Data, or a similar type of architecture, where each processor can stream content from any disk within the array, and with 10 disks used for storage in the array, the server could accommodate 450 simultaneous streams. However, if all of the copies of a content are on a single disk then the server would be able to accommodate no more than 45 streams of that content. Thus, the preferred embodiment, calls for replicating the most demanded content onto several disks. In the example above, if the piece of content is replicated on each disk, the simultaneous stream count increases from 45 streams (the content is only on a single disk) to 450 streams (copies of the content are on each of the ten disks).

Therefore, the most requested content should be duplicated onto more than one disk. Conversely, the other content, which is little requested, resides in only one location within the array, although there may be one or more copies of the content, depending on the extent of the lesser demand. In a server with disk array composed of 10 disks storing content (other disks may be utilized for parity storage), with a capacity for 1600 hours of content or 800 movies (160 hours or 80 movies per disk), each disk should have the most requested content, for example 20 movies, with the remaining capacity used to store a subset of the remaining movies. In this example, the array would have the 20 most requested movies on each disk, and each of the remaining 600 movies would reside in only one location on the disk array, so the total number of movies stored would be 620. With such structure the IAMS monitors demand and either automatically or manually duplicates the high demand content and distributes it on the disk arrays appropriately and then removes excess copies of content as demand subsides. This technique of managing content within a disk array can be utilized at each location where a server has more than one disk for storage of content. Thus, in another aspect of the preferred embodiment of the present invention, the system replicates titles on each disk array to support streaming to a greater number of subscribers. The most demanded content is duplicated on each disk within the array to ensure that such content is available when requested and that other content is not blocked out due to streaming limitations.

As shown in FIG. 1, an Intelligent Asset Management System (IAMS) 105 manages the storage of the content files across the VOD system. The IAMS is connected to and in communication with the VOD servers 110, 115, 120 and 125 and it receives, stores and maintains information about the content files, and monitors, manages and controls the VOD system 100, including the distribution of the content files across the VOD servers. The IAMS monitors the usage of the content files and determines where the files should be stored in the system and interfaces with the VOD servers to manage the content stored on the various VOD servers. The IAMS is capable of receiving and processing up-stream information received from subscribers and stores and maintains such information. Network 150 may be a downstream link or may be a bidirectional link. Likewise, link 135 may be an upstream link or may be a bidirectional link. Thus, the information may be transferred via the network 150 and link 140, or via the link 135, as desired.

Content providers provide content to the VOD system in various formats. For example, the system may receive RF signals by satellite, ATM data from ATM networks, local feeds and other information via terrestrial link. The content provider may also provide the content by tape, DVD, or any other desired and suitable media. The content is received, processed, and reformatted as necessary. For example content may be received in digitally compressed format and demultiplexed by a demultiplexer and stored in any convenient format or formats, such as MPEG or MPEG2, but the present invention is not limited to these formats. The reformatted content is stored on the VOD servers. Further, the content may be stored in an encrypted format and may stream in such format or be encrypted with each session streamed.

Figure 2:
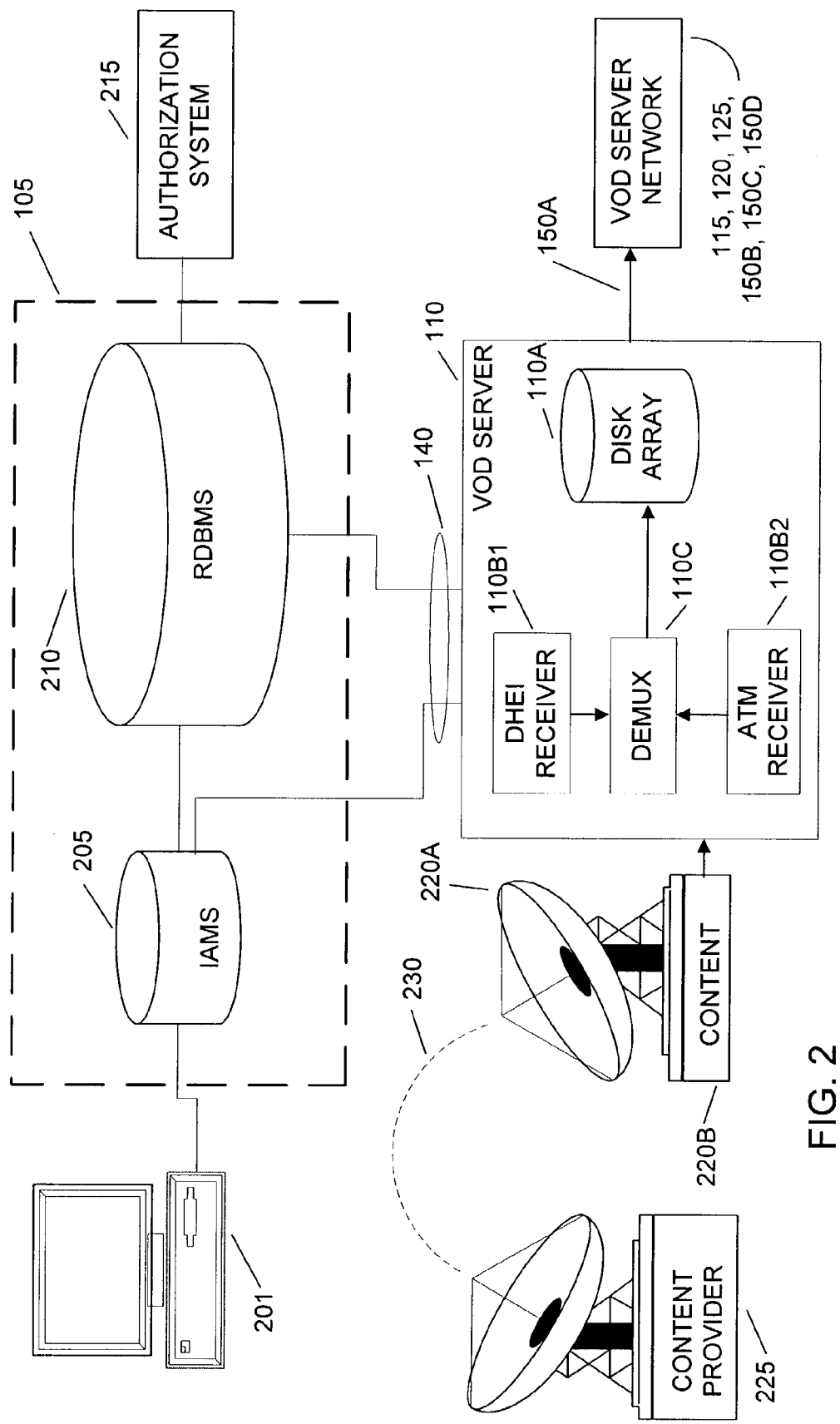
FIG. 2 illustrates the Video On Demand system of the present invention in its preferred environment.

As shown in FIG. 2, a VOD server 110 may include various components, including storage means, such as a disk array 110A, such as a JBOD Oust a bunch of disks) or RAID (redundant array of inexpensive disks) with various architectures and interfaces, such as FC-AL (Fibre Channel-Arbitrated Loop) or SSA (Serial Storage Architecture), receivers 110B for receiving content from content providers, such as DHEI (DigiCable Headend Expansion Interface) receivers 110B1 or ATM (Asynchronous Transfer Mode) receivers 110B2, and demodulating and demultiplexing circuitry 110C. Each System typically has a receiver ("Catcher's Mitt") 220A, 220B to receive content from the content providers. Content transmission from the content providers 225 to the System 100 is often via satellite feed 230, but may be by any desired and appropriate transmission link or manual method, such as by a tape or disk.

The IAMS 105 preferably includes a CPU or other processing device 205, and a relational database management system (RDBMS) 210. The RDBMS 210 functions as a server or storage device and has appropriate software and storage devices. The storage devices of the RDBMS 210 contain a listing or table of one or more of the following: the content providers, the subscribers, the servers upon which the content is located, the orders, the purchase history of each subscriber, the content files, meta-data related to the content files, and data regarding the usage (demand) of the content. The IAMS 105 is connected to a computer terminal 201 whereby a system operator can provide the appropriate input data and changes and control the operation of the system. The IAMS 105 is also connected to an authorization system 215 which contains information on the features, privileges, benefits, bonuses, space, tiers, etc., available to each subscriber and/or to each content provider. The authorization system 215 may be external to the IAMS 205, as shown, or may be included within the IAMS 205, such as part of the RDBMS 210. Thus, when a subscriber requests a movie, the IAMS 105 queries the authorization system 215 to determine whether or not the subscriber is authorized to receive the movie. If so, then the request may be approved. If not, then the request may be denied. Likewise, if a content provider wishes to store a movie, that request may be granted or denied, or may be granted only with certain restrictions, such as to size or location.

When a subscriber 130 requests a program, such as a movie, the request is sent to a VOD server 110, 115, 120, 125 through the network 150 for the System. The VOD server selects and spools a content file for the movie from storage, such as from storage 110A if provided by server 110, or from other storage if provided by another server 115, 120, 125, and delivers it to the subscriber 130, such as by video stream. The IAMS 105 records information associated with the request such as the identity of the subscriber, the time and date of the request, etc.

The IAMS serves as a content asset management system by providing the system operator with a system for the allocation of content in accordance with an algorithm. Individual VOD server content is loaded and maintained consistent with the algorithm such that maximum content is available on all servers consistent with the operator space allocations and content provider program content allocation decisions.

The IAMS preferably moves content between the storage locations throughout the VOD server network or within a storage unit. The IAMS monitors several variables, including the demand for content files, the use of the content files, the content age, which user has selected what content, demographics of users, and other variables. Based on these variables, the IAMS determines the most efficient place of storage and moves content between storage locations or to within a disk array, thereby changing the proximity and availability of content files in relation to the subscriber. In addition the IAMS can be programmed with additional information such as expected future demand.

Thus, content is divided between the high demand content which is stored in servers 120, 125 located closer to the subscriber such as the headend or hub servers (hereinafter referred to as Edge Servers since these servers sit of the edge of the network close to the subscribers), and low demand content which is stored further from the subscriber on a large centrally located server, such as the region or library servers 110, 115. Within a location, high demand content may be duplicated within the disk array to reside on each disk with the low demand content being distributed throughout the entire array. Because of the limited storage capacity of Edge Servers, not all content can be stored there and thus the content on those servers must constantly be adjusted as demand for particular content varies over time. For example, a particular movie may be in very high demand when first available, but after most of the interested subscribers have seen the movie, the demand may fall dramatically. By placing the high demand content near the customer, the demands on the outer-server transport network decrease, providing increased performance and, thus, availability. Then, when the high demand period has ended, the content may be moved further from the subscriber thus conserving Edge Server capacity, total storage capacity, and transport capacity, without significantly affecting performance or availability. Likewise, when demand is low, duplications of content that had been created may be eliminated. Conversely, low demand content may be moved closer to the subscriber or duplicated if there is a resurgence in interest of that content.

The IAMS preferably allows the System operator to program the criteria by which the content files are replicated or moved throughout the server network. For example, the IAMS may provide the user with an input screen to which the user may select various criteria for the IAMS to use in dynamically moving the files. Alternatively, the video serving system may be preprogrammed to most efficiently move content within the network.

The IAMS may also monitor advertising. When content is newly released or when there is an advertising push for the content, the content may be duplicated or moved out to the Edge Servers where the most advertising dollars are invested. Thus, the availability of content is targeted to the same customers at whom the advertising is targeted. When the ad campaign subsides, the content may be moved back to the region servers or duplications eliminated.

The IAMS periodically, and also on demand, determines whether a content file should be moved to another location on the VOD server network or duplicated. For example, the IAMS may determine whether the demand for a content file exceeds a predetermined threshold. If the demand exceeds the threshold, the IAMS instructs the VOD server to move the file closer to the subscriber or an additional copy of the content may be added to another disk array at the Edge Servers. Conversely, if the demand for a file falls below a particular threshold the IAMS may instruct the VOD server to move the content file farther from the subscriber or to maintain fewer copies at the headend. These demand measurements may be performed on multiple parts of the System to determine the proper location for the content file. For example, demand may be measured at the hub, headend, region or library levels. In some situations, there may be local disparities. For example, a school assignment may cause a high demand in one or two closely related areas but may not affect demand in other areas. In such a case, the content will be pushed to the levels adequate to service the local demand, but will otherwise remain at the region or library level.

The IAMS also preferably determines the demand for a content file relative to the demand for other content files. For example, even if the demand for a content file is above a predetermined threshold there may be files that are even in greater demand and which therefore have priority for the limited storage space available at a storage location close to the subscriber.

The IAMS also preferably monitors the subscriber attributes associated with the selection of the content files. For example, a System operator may be most interested in the content files that are selected by viewers who are between the ages of 18 and 35. The IAMS collects any available information on the demographics of the subscribers and if a large number of subscribers of this age group requests a particular content file the IAMS may move the content file closer to the user even if another file has a higher overall demand. The IAMS may also review the System and determine whether or not other parts of the System have similar demographics and move the content closer to the subscriber in those other parts of the System in anticipation of the demand.

The IAMS may monitor demand for a particular piece of content via actual demand within the System or may determine the demand from sources outside the System. For example, demand ratings could be input by a System operator, MSO, or by the content provider, or the IAMS could query other sources such an Internet web sites that rate the popularity of content. This information can then be used to determine the proper location of the content and may also be used for categorization of the content such as, pricing, availability, or the like.

A System operator may instruct the IAMS to move content based upon the demand within a System. For example, a System may serve a broad-base of subscribers, some of which share common characteristics such as ethnic heritage. When content is released that is likely to appeal to a particular subset of the subscriber base, the content may be duplicated or moved to Edge Servers that serve those subscribers. Alternatively, although content, on its face, may not appear appealing to a particular demographic subset, the IAMS may determine, such as by monitoring content requests, that the content does appeal to a particular group, say for example, that of Latin American heritage. The IAMS may then make that content more readily available within the System to serve that group.

Similarly, an MSO may desire to move content from one System to another to ensure maximum performance and availability within the network. For example, the MSO may have content that deals with two cities, for example Atlanta and Seattle, that are served by different Systems owned or controlled by the same MSO. If the content is not in demand across the country and does not, on its face, appear to be appealing to these two regions, the content may originally be stored at the cable library far from the subscribers. However, if subscribers in these cities are more interested in the content than subscribers in other areas then, as demand begins to rise in Atlanta and Seattle, the IAMS may determine that the demand for the content in those regions is sufficient to duplicate or move the content file so the subscribers have greater access to the content. Likewise, if there are certain Edge Servers where there is a higher demand for the content, the content may be moved to those Edge Servers. The content may be maintained in those locations until demand begins to subside at which time it may be moved to more centralized locations or duplications eliminated. In this way the content does not occupy valuable space at the Edge Servers or other servers unless it is of interest to the subscribers.

The term "move", as used herein, generally means simply copying the file to another location on the network or duplicating the file within a disk array. For example, a content file may be "moved" (copied) from the VOD library to the head-end, and then later "moved" (deleted) from the head-end. However, the term "move", as used herein, may also mean actually moving the only copy of a file through the VOD server network.

The IAMS also preferably includes a storage allocation subsystem for the System operator for planning and maintaining of server space allocations into various use categories and content providers. For example, the IAMS may provide the System operator with the ability to assign particular storage locations for movies or interactive content, ensuring that each server has a sufficient variety of content available for subscribers.

The storage capacity of each server is finite. The storage of approximately 100 hours of video content in 3 Mbps MPEG2 requires approximately 13,500 MB of storage space. However, the video server storage capacity required for a content file depends on the compression format and encoding rates, as well on the number of video streams to be delivered. It will be appreciated that higher encoding rates provide a higher quality of video. For example, a content file with MPEG2 content encoded at 6 Mbits per second will provide higher quality video, but will require more video storage capacity than a file with MPEG1 content encoded at 1.5 Mbits per second.

The IAMS database may store data relating to the title and type of program, the size of the content file, the date the file loaded on the VOD system or a particular server, the demand for the file by subscribers, and the demographics of requesting subscribers, etc.

The IAMS preferably provides the System operator and, if approved, a content provider, with the ability to query, sort, and generate reports from the data stored in the IAMS database. For example, the party may query the IAMS database, select, and display a current list of content files by server or in a particular server, including data such as file name, content type (movie, documentary, advertisement, etc.), file size, content categorization information, the number of requests from subscribers, other demand or usage, etc. The party can, if desired, specify which content files are to be added, deleted, or moved to or from a particular server but, preferably, such movement is performed automatically. Preferably the party is provided with a graphical user interface (GUI) for interacting with the IAMS database.

The IAMS preferably includes a security feature that prevents the System operator from exceeding the storage limits of a particular server. This security feature may be implemented in the processing unit 105, the RDBMS 210, the servers 110, 115, 120, 125, or any combination thereof. Thus, the IAMS acts to prevent the System operator from loading too much content into a server's limited storage space. The IAMS reviews instructions from the System operator to insure that the request is within the proper parameters. For example, a System operator may request that a 180-minute movie be added to a particular headend server. Upon receipt of this request, the IAMS calls up a data table associated with the particular server. The IAMS determines the content files currently stored on the server and the amount of available storage. If there is sufficient space available for the new movie, the IAMS accepts the request and directs the loading of the movie on the appropriate server. On the other hand, if there is insufficient space available for the movie, the IAMS informs the operator that there is insufficient storage space. For example, the system may display a message informing the operator that there is only 100 minutes of storage space left on that particular server and that the request to load the movie which is longer than 100 minutes is denied.

The IAMS preferably also prompts the user to delete files to make room for the new file, or provides a list of files recommended for removal from that tier to make room for the new file. For example, the system may track the usage of the files and recommend that files with the lowest usage on the tier be deleted, or display combinations of files which, if deleted, would provide sufficient space for the new file. The system may also perform algorithms to determine the best files to delete based upon variables, such as the usage of the files and their sizes.

Preferably the IAMS has an authorization system that limits access of a given user to only authorized data. For example, the system may require a user identification and password for access to particular data prior to performing user requests. If the user is approved, the IAMS will review the request and make sure that it is within proper parameters.

The IAMS also preferably includes a subsystem for planning and managing content availability scheduling. For example, the System operator may be provided with a monthly calendar showing the content that will be loaded at each location by time and date. The System operator may then denote the start and end times for the loading of particular content files on a particular location. For example, the System operator may specify that a first movie be loaded on the head Edge Server on the first day of a month and that the movie be removed on the 15th day of the month to be replaced by a sequel to the movie.

The IAMS system also preferably includes a report generator through which the System operator may query the System and generate reports such as a list of the usage of the content files broken down in various ways, such as by System segment, or headend, region, or library or the activity for a particular VOD server.

The IAMS preferably provides additional tools such as billing interfaces for various billing systems. The RDBMS may use various commercially available RDBMS software such as Oracle™ RDBMS software, and use various platforms or operating systems such as UNIX™ or Windows NT™. Furthermore, the RDBMS does not need to be located near the VOD Servers. For example, the IAMS may be located in a computer room remote from any VOD Server. In addition, the system operator and content providers may also be in geographically disparate locations.

Figure 3:
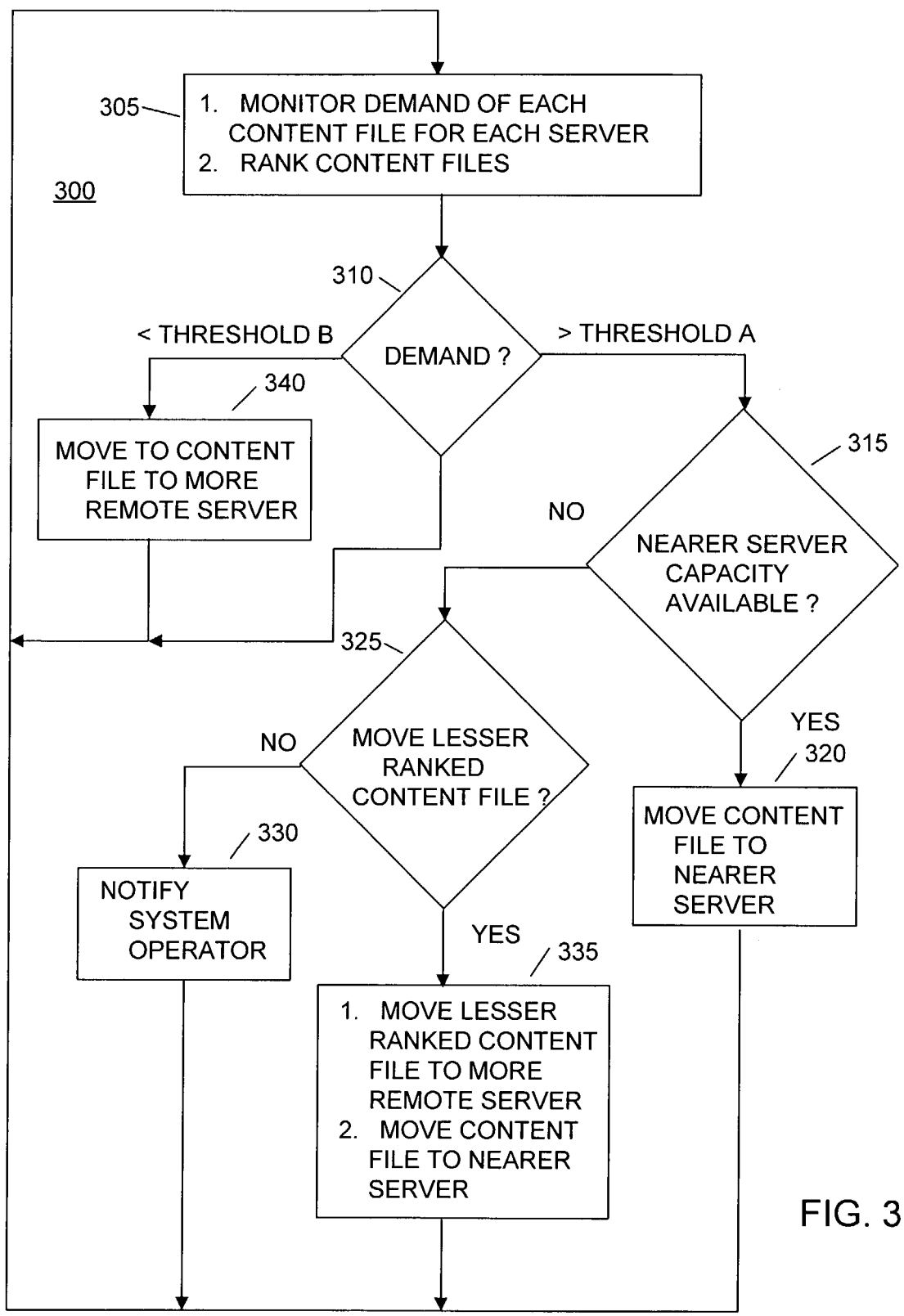
FIG. 3 is a flowchart of one aspect of the preferred operation of the present invention.

FIG. 3 is a flowchart of one aspect of the preferred operation of the present invention. The method 300 involves monitoring the demand of the content files and moving them to a nearer server (closer to the subscribers) or moving them to a more remote server (further from the subscribers). In the preferred embodiment the method is performed periodically. However, the method may be performed continuously, or on demand, if desired. Step 305 monitors the demand for each of the content files with respect to each server and then ranks the content files on each server.

Decision 310 tests the demand. If the demand is within a window, less than Threshold A but greater than Threshold B, then no action need be action. If the demand is outside the window then action should be considered. The window size may be fixed, or may be variable, for example, based on the total demand for content from a particular server. Further, the window size may vary from server to server, for example, servers with more storage may have wider windows.

At decision 310, if the demand is greater than a first threshold, Threshold A, then consideration should be given to moving the content file to a nearer server or servers so as to improve availability and response time, and decrease the load on the inter-server communications links. Therefore, decision 315 tests whether capacity is available at the nearer server. If capacity is available then, in step 320, the content file is moved to the nearer server. If decision 310 is operating on the nearest server, for example, node 125A, then there is no nearer server so the content file cannot be moved. However, if decision 310 is operating on a more remote server, server 120A for example, then decision 315 may need to be performed for several nearer servers 125. In this case, the demand may be considered to determine from where it has arisen. For example, if all of the demand is from customers serviced by server 125A, then there is no need to consider moving the content file to any of the other servers 125. However, if the demand is from customers serviced by several servers 125A, 125B, 125C (not shown), then decision 315 would be performed for each of those several servers.

At decision 315, if capacity is not available at the nearer server then decision 325 tests whether a lesser-ranked content file can be moved to a more remote server so as to make room for the higher-ranked content file. If so, then in step 335 the lesser-ranked content file is moved to a more remote server and the subject content file is moved to the nearer server. If not, then in step 330 the system operator is notified but the content file is not moved. Even though a content file may have a lesser rank than another file the system operator may specify that the lesser-ranked file is not to be moved, or is not to be moved for a certain time, or until after a certain date, etc. This allows the system operator to position certain content files in expectation of future demand. For example, the demand for a sequel may be very high immediately after the first movie is shown, so it would be desirable to have that content file already available on servers nearer the customers. If the storage location were solely on a demand-based algorithm, the sequel might be stored at the most remote server 110 until demand started to rise, which might delay the performance or delivery of the sequel to the customers at the critical time, thus adversely impacting sales.

At decision 310, if the demand is less than a second threshold, Threshold B, then at step 340 the content file is moved to a more remote server so as to improve availability and response time for higher-ranked content files, and decrease the load on the inter-server communications links. Again, as above, the system operator may specify that a file is not to be moved, or is not to be moved for a certain time, or until after a certain date, etc., to allow the system operator to position certain content file in expectation of future demand.

Therefore, when possible, higher demand files are moved closer to the customer, and lower demand files are moved further from the customer.

Although the above process 300 is described with respect to demand for a content file, the present invention is not so limited and other characteristics can be used to determine on which server a content file should be located.

For example, the critical characteristic might be age, with newer content files being moved nearer to the customers and older content files being moved further from the customers. As another example, the critical characteristic might be demographics, wherein content files which are more oriented toward a certain demographic feature would be moved nearer to customers with those demographics, while content files which are less oriented toward a certain demographic feature would be moved more remotely from customers with those demographics. As another example, the critical characteristic might be price, with more expensive content files being moved nearer to the customers, who will expect better performance for the higher price, and less expensive content files being moved further from the customers, who will tolerate lesser performance in exchange for the lower price.

As previously mentioned, at decision 310, if the demand is within the window then no action need be taken. However, if desired, steps 305 and 310 may be performed again, but using a different characteristic and window.

FIG. 3 also is applicable to situations involving a single valued window. For example, a test for a characteristic being less than a predetermined value can be considered to be a test for that characteristic being from zero to that certain value. Likewise, a test for a characteristic being greater than a predetermined value can be considered to be a test for that characteristic being from that certain value to the maximum value that the processing system can accommodate.

FIG. 3 also is applicable to situations involving the presence or absence of a characteristic. For example, a test for a characteristic being there (logical 1) can be considered to be a test for that characteristic being greater than zero (logical 0).

Thus, FIG. 3 is applicable to testing the quality of any desired characteristic and is not limited to strictly testing whether a characteristic is within a conventional window.

Figure 4:
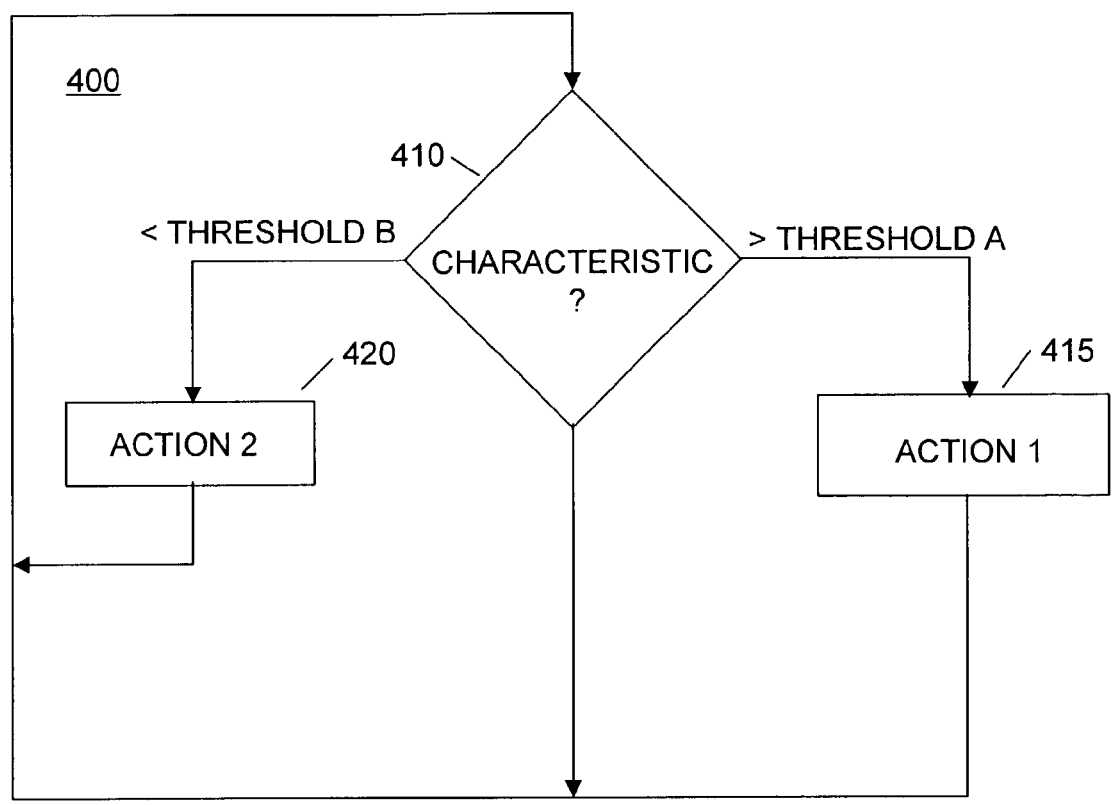
FIG. 4 is a flowchart of another aspect of the preferred operation of the present invention.

FIG. 4 is a flowchart of another aspect of the preferred operation of the present invention. The method 400 monitors a specified characteristic for a disk array. In the preferred embodiment, the monitored characteristic is the demand for content files on the disk array. If the demand from a disk array or a particular disk within the array is too great then performance may suffer and/or content may not be available. Conversely, if the demand for content residing on a disk array is minimal, then content or duplications may be removed from that disk array to provide for storage of content which is in great demand. Other characteristics may be used in addition to, or instead of, demand. For example, the delay time between a request for an item and the delivery of the item may be monitored. As another example, the delay time between a request for a rewind operation and the start of the delivery of the rewind data may be monitored. Therefore, decision 410 monitors the characteristic, for a disk array. If the characteristic is not within a desired window then appropriate action is taken.

For example, if the characteristic is demand for a particular content file, and the demand exceeds a first predetermined threshold, then the action 415 may be to move (duplicate) the content onto another disk within the array or to another array so that two disks or two arrays, as the case may be, are providing the content, thereby reducing the demand for the content from the original disk array. Conversely, if the demand is less than a second predetermined threshold, then the action 420 may be to determine if two disk arrays are providing the same content and, if so, consolidate the content onto a single disk array, thereby freeing up space on one of the disk arrays to store and service content which has a demand that is close to or exceeding the servicing ability of another disk array.

Thus, in this aspect, content is moved horizontally or laterally, between servers or disk arrays of similar ranking, as opposed to being moved vertically between servers or disk arrays of different ranking (proximity to the subscriber).

It is generally desirable to manage the use of the various servers so that servers closest to the subscribers are completely filled with relevant content. By so doing, the response time to the subscriber will be optimal. In addition, if a subscriber requests a content, and there is a noticeable delay while the content is being downloaded from the content library, then the subscriber may be dissatisfied with the apparently slow response, may believe that this is the response that will be provided for the entire content duration, may reconsider the request, and may even cancel the request, thus causing a loss of revenue to the system operator. However, if the content is already on the server closest to the subscriber, then the content can be delivered immediately, thus reducing the likelihood that a subscriber will cancel, or will be able to cancel, the request.

Thus, in this scenario, the characteristic monitored by the method 400 is the unused storage space on a server. If the unused storage space exceeds a first threshold then a first action is taken, such as moving relevant content to the server. If the unused storage space is less than the first threshold then a second action is taken, such as reviewing the content to determined that all of the content on that server is being used or is relevant, and then removing unused and non-relevant content to make storage space for other content. Relevant content may be content that has a low but recurring demand in an area, or content that is expected to shortly be in high demand, or content that is appropriate for the particular demographics, etc. If the unused storage space is between the thresholds then no action need be taken but, if desired, the second action could still be taken.

This aspect is particularly appropriate for the hub servers, that is, those closest to the subscribers, such as hub servers 125 and headend servers 120, but can also be performed for more remote servers, such as server 115, if desired.

Thus, it will be appreciated that the present invention provides many valuable features and capabilities not available in the prior art. Some, but not all, of these features are the ability to obtain information indicative of whether the content should be moved closer to or further from the subscriber, or additional copies provided, the ability to set criteria to automatically cause the movement of the content within the system, and security features. Further, these features and capabilities may be used independently of one another; it is not necessary to implement every feature and capability described herein in order to obtain the benefit of the present invention.

Variations of the present invention will suggest themselves to those of skill in the field upon a reading of the disclosure herein. Therefore, the scope of the present invention is to be determined only by the claims.

What is claimed is:

1. A method of managing content for a video on demand (VOD) system, the VOD system comprising a plurality of VOD servers, the plurality of VOD servers containing a plurality of content files, some VOD servers being located nearer to a customer than more remote VOD servers, the method comprising:

automatically monitoring the demand for the content files;
determining whether the demand for a content file on a VOD server of the plurality VOD serves has a predetermined quality by determining whether an advertising campaign is associated with the content file; and
where there is the advertising campaign separate from and associated with the content file, performing:
    determining a different content file on a nearer VOD server that can to be moved to a more remote VOD server;
    moving the different content file to the more remote VOD server; and
    moving the content file to the nearer VOD server based only upon the advertising campaign being associated with the content file.

2. A method of managing content for a video on demand (VOD) system, the method comprising:
monitoring a characteristic of a content file on a VOD region server, the characteristic consisting essentially of whether a separate advertising campaign is associated with the content file;
where the characteristic is true,
  i. performing the steps of:
    1. determining a different content file on a nearer VOD server that can to be moved to a more remote VOD server;
    2. moving the different content file to the more remote VOD server; and
    3. moving the content file having the characteristic to the nearer VOD server, wherein the nearer VOD server comprises a node VOD server nearer customers to whom the advertising campaign is directed; and
  ii. else, if it is determined that the characteristic is false, then moving the content file to the more remote VOD server.

3. The method of claim 2, wherein the nearer VOD server comprises a VOD node server and the more remote VOD server comprises the VOD library server.

4. The method of claim 3, further comprising determining a second characteristic of the content file, wherein the second characteristic comprises an age of the content file.

5. The method of claim 3, further comprising determining a second characteristic of the content file, wherein the second characteristic comprises demographic information associated with the content file.

6. The method of claim 3, further comprising determining a second characteristic of the content file, wherein the second characteristic comprises a consumer price of the content file.

7. The method of claim 2, wherein the nearer VOD server comprises a VOD headend server and the more remote VOD server comprises a VOD library server.

8. The method of claim 7, further comprising determining a second characteristic of the content file, wherein the second characteristic comprises an age of the content file.

9. The method of claim 7, further comprising determining a second characteristic of the content file, wherein the second characteristic comprises demographic information associated with the content file.

10. The method of claim 7, further comprising determining a second characteristic of the content file, wherein the second characteristic comprises a consumer price of the content file.

11. A system for managing video on demand (VOD) content, the system comprising:
a. a VOD library server coupled to a plurality of VOD region servers;
b. a first VOD region server from the plurality of VOD region servers, wherein the first VOD region server is coupled to a plurality of VOD headend servers;
c. a first VOD headend server from the plurality of VOD headend servers, wherein the first VOD headend server is coupled to a plurality of VOD node servers;
d. a first VOD node server from the plurality of VOD node servers, wherein the first VOD node server is coupled to a plurality of subscriber devices; and
e. an asset management system comprising a processor programmed to perform the steps of:
  i. monitoring a characteristic of a content file that resides on one of the first VOD region server, the first VOD headend server, or the first VOD node server, the characteristic consisting essentially of an indication of an advertising campaign being associated with and separate from the content file;
  ii. determining whether the characteristic of the content file is true or false;
    1. if it is determined that the characteristic is true, performing the steps of:
      a. determining a different content file on a nearer VOD server that can to be moved to a more remote VOD server;
      b. moving the different content file to the more remote VOD server; and
      c. moving the content file to the nearer VOD server; and
    2. else, if it is determined that the characteristic is false, then moving the content file to the more remote VOD server.

12. The system of claim 11, wherein the content file resides on the first VOD region server, the nearer VOD server comprises the first VOD headend server, and the more remote VOD server comprises the VOD library server.

13. The system of claim 12, wherein the processor is further programmed to determine a second characteristic for the content file, wherein the second characteristic comprises a demand for the content file.

14. The system of claim 12, wherein the processor is further programmed to determine a second characteristic for the content file, wherein the second characteristic comprises an age of the content file.

15. The system of claim 12, wherein the processor is further programmed to determine a second characteristic for the content file, wherein the second characteristic comprises demographic information associated with the content file.

16. The system of claim 12, wherein the processor is further programmed to determine a second characteristic for the content file, wherein the second characteristic comprises a consumer price of the content file.

17. The system of claim 11, wherein the content file resides on the first VOD region server, the nearer VOD server comprises the first VOD node server, and the more remote VOD server comprises the VOD library server.

18. The system of claim 17, wherein the processor is further programmed to determine a second characteristic for the content file, wherein the characteristic comprises a demand for the content file.

19. The system of claim 17, wherein the processor is further programmed to determine a second characteristic for the content file, wherein the second characteristic comprises an age of the content file.

20. The system of claim 17, wherein the processor is further programmed to determine a second characteristic for the content file, wherein the second characteristic comprises demographic information associated with the content file.

21. The system of claim 17, wherein the processor is further programmed to determine a second characteristic for the content file, wherein the second characteristic comprises a consumer price of the content file.

22. The system of claim 11, wherein the content file resides on the first VOD headend server, the nearer VOD server comprises the first VOD node server, and the more remote VOD server comprises the first VOD region server.

23. The system of claim 22, wherein the processor is further programmed to determine a second characteristic for the content file, wherein the second characteristic comprises a demand for the content file.

24. The system of claim 22, wherein the processor is further programmed to determine a second characteristic for the content file, wherein the second characteristic comprises an age of the content file.

25. The system of claim 22, wherein the processor is further programmed to determine a second characteristic for the content file, wherein the second characteristic comprises demographic information associated with the content file.

26. The system of claim 22, wherein the processor is further programmed to determine a second characteristic for the content file, wherein the second characteristic comprises a consumer price of the content file.

27. The system of claim 11, wherein the content file resides on the first VOD headend server, the nearer VOD server comprises the first VOD node server, and the more remote VOD server comprises the VOD library server.

28. The system of claim 27, wherein the processor is further programmed to determine a second characteristic for the content file, wherein the second characteristic comprises a demand for the content file.

29. The system of claim 27, wherein the processor is further programmed to determine a second characteristic for the content file, wherein the second characteristic comprises an age of the content file.

30. The system of claim 27, wherein the processor is further programmed to determine a second characteristic for the content file, wherein the second characteristic comprises demographic information associated with the content file.

31. The system of claim 27, wherein the processor is further programmed to determine a second characteristic for the content file, wherein the second characteristic comprises a consumer price of the content file.

32. A method of managing content for a video on demand (VOD) system, the VOD system comprising a plurality of VOD servers, some VOD servers being located nearer to a customer than more remote VOD servers, the method comprising:
    determining whether there is an advertising campaign, separate from and associated with a content file;
    determining a nearer VOD server corresponding to locations of advertising campaign dollar investment;
    determining a different content file on the nearer VOD server that can to be moved to a more remote VOD server;
    moving the different content file to the more remote VOD server; and
    moving the content file to the nearer VOD server based upon only the advertising campaign being associated with the content file.

* * * * *